United States Patent
Alderson et al.

(10) Patent No.: US 11,076,598 B2
(45) Date of Patent: Aug. 3, 2021

(54) PEROXIDE-BASED DISINFECTING SOLUTIONS CONTAINING INORGANIC SALTS

(71) Applicant: Diversey, Inc., Fort Mill, SC (US)

(72) Inventors: Faraz Alderson, Mississauga (CA); Pierre Grascha, Cormontreuil (FR); Matthew Alasdair Timothy Slack, Ashbourne (GB)

(73) Assignee: Diversey, Inc., Fort Mill, SC (US)

( * ) Notice: Subject to any disclaimer, the term of this patent is extended or adjusted under 35 U.S.C. 154(b) by 0 days.

(21) Appl. No.: 15/898,388

(22) Filed: Feb. 16, 2018

(65) Prior Publication Data

US 2018/0235231 A1 Aug. 23, 2018

Related U.S. Application Data

(60) Provisional application No. 62/460,115, filed on Feb. 17, 2017.

(51) Int. Cl.
| A61K 9/00 | (2006.01) |
| A01N 59/00 | (2006.01) |
| A01N 25/02 | (2006.01) |
| A01N 25/30 | (2006.01) |

(52) U.S. Cl.
CPC .............. *A01N 59/00* (2013.01); *A01N 25/02* (2013.01); *A01N 25/30* (2013.01)

(58) Field of Classification Search
CPC .................................................... A01N 59/00
See application file for complete search history.

(56) References Cited

U.S. PATENT DOCUMENTS

| | | | | |
|---|---|---|---|---|
| 5,314,823 A | * | 5/1994 | Nakagawa | A61L 12/082 435/264 |
| 5,549,894 A | * | 8/1996 | Hunt | A61K 38/17 424/94.63 |
| 6,103,683 A | | 8/2000 | Romano et al. | |
| 6,162,393 A | * | 12/2000 | De Bruiju | A61L 12/08 422/28 |
| 6,534,075 B1 | | 3/2003 | Hei et al. | |
| 8,865,226 B2 | | 10/2014 | Bobbert | |
| 8,883,074 B2 | | 11/2014 | Bobbert | |
| 9,023,374 B2 | | 5/2015 | Touitou | |
| 2005/0255172 A1 | * | 11/2005 | Omidbakhsh | A61K 33/40 424/616 |
| 2006/0035842 A1 | * | 2/2006 | Tsuzuki | A61K 9/0024 514/23 |
| 2006/0204467 A1 | | 9/2006 | Littau et al. | |
| 2010/0028458 A1 | * | 2/2010 | Bobbert | A61K 33/40 424/616 |
| 2010/0104528 A1 | * | 4/2010 | Marlowe | A01N 33/16 424/78.08 |
| 2011/0311646 A1 | * | 12/2011 | Millard | C11D 3/0078 424/616 |
| 2013/0210923 A1 | | 8/2013 | Zhu | |
| 2013/0230609 A1 | | 9/2013 | Modak et al. | |
| 2014/0242198 A1 | | 8/2014 | Modak et al. | |
| 2015/0150262 A1 | | 6/2015 | Zhu et al. | |

FOREIGN PATENT DOCUMENTS

| CA | 2475327 | | 8/2003 |
| EP | 1483361 | A1 | 12/2004 |
| WO | 9725405 | A1 | 7/1997 |
| WO | 9731093 | A1 | 8/1997 |
| WO | 2005/110090 | | 11/2005 |

OTHER PUBLICATIONS

Lim et al, Common eye drops and their implications for pH measurements in the management of chemical eye injuries, Int. J. Ophthal., 2014, 7(6), 1067-1068 (Year: 2014).*
Abelson, Normal Human Tear pH by Direct Measurement, Arch. Ophthal., 1981, 99, 301 (Year: 1981).*
Extended European Search Report of counterpart patent application E18753850.9 dated Nov. 27, 2020; 10 pages.

* cited by examiner

*Primary Examiner* — Paul W Dickinson
(74) *Attorney, Agent, or Firm* — Warunee Srisiri-Sisson, Diversey, Inc.

(57) ABSTRACT

An aqueous disinfecting solution and uses and methods of disinfection and sanitization employing same. The solution comprises at least one inorganic salt selected from the group consisting of sulfate, chloride, bromide, iodide, carbonate, phosphate, fluoride, and nitrate salts in a concentration of from about 0.1 to about 15 wt. %; at least one peroxide compound in a concentration of from about 0.01 to about 8 wt. %; and at least one amphoteric amine oxide surfactant having the formula R1R2R3NO wherein each of R1, R2, and R3 is independently a saturated, unsaturated, substituted or unsubstituted linear or branched alkyl group having from 1 to 28 carbon atoms in a concentration of from about 0.01 to about 15 wt. %.

15 Claims, No Drawings

PEROXIDE-BASED DISINFECTING SOLUTIONS CONTAINING INORGANIC SALTS

This application claims the benefit under 35 U.S.C. 119(e) of U.S. provisional patent application 62/460,115 filed Feb. 17, 2017, the contents of which are incorporated herein by reference.

FIELD OF THE INVENTION

The present invention relates to peroxide containing disinfecting solutions.

BACKGROUND OF THE INVENTION

A wide range of disinfectants is known, as discussed for example in Disinfection, Sterilization, and Preservation, edited and partially written by Professor Seymour S. Block, Fifth Edition, published 2001 by Lippincott Williams & Wilkins, Philadelphia. Certain peroxygen compounds, chlorine compounds, phenolics, quaternary ammonium compounds and surface-active agents are known for their germicidal properties. The rate of disinfection is relatively slow in many cases, and some compounds emit volatile organic compounds or leave a persistent and/or toxic residue in the environment.

Peroxide compounds, including hydrogen peroxide, are finding favor in many applications because their breakdown products, water and oxygen, are innocuous. Furthermore, they tend to have a broad spectrum of antimicrobial activity. Broad spectrum activity is important in situations where harmful organisms are present but their identity is not known. However, even so-called "broad spectrum" disinfectants may not be effective to kill all organisms, or all organisms within a sufficiently short contact time. For example, some peroxide-based disinfectants may take 30 minutes or more after application of the disinfectant to disinfect a treated surface. In many circumstances, this rate of disinfection is far from satisfactory.

Another drawback of some peroxide disinfectants is that they are too harsh to be used on vulnerable surfaces such as skin, plants or soft metals due to the need for a higher concentration of peroxides and/or a corrosive pH range.

Accordingly, there is a need for a peroxide-based disinfectant that can kill a wider variety of organisms including gram positive bacteria (e.g. *E. hirae*), fungi (e.g. *Candida albicans*) and viruses (e.g. Poliovirus), at shorter contact times, and can be made compatible with sensitive surfaces. Furthermore, such disinfectant should have desirable aesthetic characteristics such as the absence of malodor.

The present invention is intended to meet at least one of these needs.

SUMMARY OF THE INVENTION

Surprisingly, the inventors have found that the antimicrobial activity of an aqueous, acidic disinfecting solution comprising at least one peroxide compound, and at least one amphoteric amine oxide surfactant can be enhanced by the addition of at least one inorganic salt in accordance with the invention. By "enhanced" is meant that the solution exhibits a higher level or degree of microbial kill, or is effective against a wider range of microorganisms, or both.

According to one aspect, the invention provides a disinfecting solution comprising:

a. at least one inorganic salt selected from the group consisting of sulfate, chloride, bromide, iodide, carbonate, phosphate, fluoride, and nitrate salts in a concentration of from about 0.1 to about 20 wt. %;
b. at least one peroxide compound in a concentration of from about 0.01 to about 8 wt. %;
c. at least one amphoteric amine oxide surfactant having the formula R1R2R3NO wherein each of R1, R2, and R3 is independently a saturated, unsaturated, substituted or unsubstituted linear or branched alkyl group having from 1 to 28 carbon atoms in a concentration of from about 0.01 to about 20 wt. %;
d. optionally, at least one cyclic carboxylic acid selected from the group consisting of salicylic acid, 2-furoic acid, benzoic acid, and salts thereof, in a concentration of from about 0.05 to about 15 wt. %;
e. optionally, at least one amphoteric surfactant selected from the group consisting of imidazoline derivatives, alkyl betaines, alkyl amidopropyl betaines, alkyl amidopropyt betaine amides, alkylsulfobetaines, and alkyl amphocarboxylates in a concentration of from about 0.01 to about 20 wt.
f. optionally, an effective amount of at least one skin conditioning agent;
g. optionally, at least one pH adjusting agent in an amount effective to adjust the pH of the solution to the below recited pH;
h. optionally, an effective amount of at least one additive chosen from buffering agents, dyes, fragrances, rheology modifiers, corrosion inhibitors, peroxide stabilizing agents, hydrotropes, non-ionic surfactants, cationic surfactants, soil suspenders or anti-redeposition agents, and additional antimicrobial agents;
i. optionally, an effective amount of at least one solvent; and
j. the balance water;
wherein the pH is from about 0.1 to about 4.

In ready-to-use disinfecting solutions, the at least one salt can be present in a concentration of from about 0.1 to about 8 wt. %; the at least one peroxide compound can be present in a concentration of from about 0.01 to about 4 wt. %; and the at least one amphoteric amine oxide surfactant can be present in a concentration of from about 0.1 to about 8 wt. %.

The disinfecting solution can be formulated in concentrated form wherein the ingredients are present in higher concentrations. Concentrates are more economical to transport and store due to their smaller weight and volume. Such concentrates can be diluted by the end user with water or another solvent to form ready-to-use solutions in accordance with the invention.

The skilled person will appreciate that the solutions can be made by combining multiple parts, with the parts being present in solid and/or liquid forms. Accordingly, the invention encompasses kits or products that contain multi-part systems wherein individual components or ingredients can be combined to provide a ready-to-use or concentrated disinfecting solution in accordance with the invention.

Embodiments of solutions in accordance with the invention are effective in passing known antimicrobial testing methods, e.g., without limitation, ASTM, EN, AOAC and OECD methods, and/or in reducing microbial populations on a surface by at least 1 log using these methods.

The present invention includes solutions, kits, products, and other variants which comprise, consist essentially of, or consist of the ingredients or compounds disclosed herein. Furthermore, in other aspects, the invention includes uses of the solution and methods of disinfection and sanitization using the solution. For example, the invention provides, according to some embodiments, a method of reducing microbial populations on a surface comprising applying an effective amount of the solution to the surface for a contact time of at least about 10, 20, 30, 40, 50, 60, 70, 80, or 90 seconds, and/or up to about 10, 9, 8, 7, 6, or 5 minutes. In some embodiments, the disinfecting solution is effective to increase the reduction of the microorganisms by at least 1 log when the at least one inorganic salt is present, as compared to when the at least one inorganic salt is absent, using the EN 1276 test method against *E. hirae* at a contact time of 30 or 60 seconds.

DETAILED DESCRIPTION OF THE EMBODIMENTS

For the sake of clarity and to avoid ambiguity, certain terms are defined herein as follows.

The term "comprising" means "including without limitation." Thus, a composition comprising a list of ingredients may include additional ingredients not expressly recited. The term "consisting of" means "including the listed ingredients and such additional ingredients as may be present as natural or commercial impurities or additives." Natural and commercial impurities will be apparent to the person of ordinary skill in the art. An example of a commercial additive are minute quantities of stabilizers in hydrogen peroxide commercial solutions, for example. The term "consisting essentially of" means "consisting of" the listed ingredients (as defined herein) plus such additional ingredients as would not materially affect (positively or negatively) the basic and novel properties of the solution." By "basic and novel properties" is meant the antimicrobial efficacy of the solution, whether in terms of degree or rate of kill, or the number or identity of microorganisms against which the composition is effective.

The term "weight percent," "Wt. %," "percent by weight," "% by weight." % w/w, and variations thereof refer to the concentration of a substance as the weight of that substance divided by the total weight of the composition and multiplied by 100.

The term "about" refers to a variation in the numerical quantity that can occur, for example, through typical measuring and liquid handling procedures used for making concentrates or ready-to-use (RTU) solutions in the real world, through differences in the manufacture, source, or purity of the ingredients used to make the compositions or carry out the methods, and the like. The term "about" also encompasses amounts that differ due to different equilibrium conditions or different reaction levels for a composition resulting from a particular initial mixture. For the sake of clarity, term "about" includes variations in the expressed value of up to 5% (plus or minus). Whether a value is modified by the term "about" or not, the claims include equivalents to the values.

When used herein, the term "effective amount" means an amount that would bring about the desired effect, based on the known purpose and function of the ingredient and application of the composition. What constitutes an effective amount will be determinable by the person of ordinary skill in the art without having to engage in inventive experimentation.

In the description and claims, the singular forms "a," "an," and "the" include plural referents unless the content clearly dictates otherwise. Thus, for example, reference to a composition containing "a compound" includes a composition having two or more compounds. It should also be noted that the term "or" is generally employed in the sense of "and/or" unless the content clearly dictates otherwise.

Unless otherwise specified, the term "alkyl" or "alkyl group" refers to hydrocarbons having one or more carbon atoms, including straight-chain alkyl groups (e.g., methyl, ethyl, propyl, butyl, pentyl, hexyl, heptyl, octyl, nonyl, decyl, etc.), cyclic alkyl groups (or "cycloalkyl" or "alicyclic" or "carbocyclic" groups) (e.g., cyclopropyl, cyclopentyl, cyclohexyl, cycloheptyl, cyclooctyl, etc.), branched-chain alkyl groups (e.g., isopropyl, tert-butyl, sec-butyl, isobutyl, etc.), and alkyl-substituted alkyl groups (e.g., alkyl-substituted cycloalkyl groups and cycloalkyl-substituted alkyl groups, etc.).

Unless otherwise specified, the term "alkyl" includes both "unsubstituted alkyls" and "substituted alkyls." The term "substituted alkyls" refers to alkyl groups having substituents replacing one or more hydrogens on one or more carbons of the hydrocarbon backbone. Such substituents may include, for example, alkenyl, alkynyl, halogena, hydroxyl, alkylcarbonyloxy, arylcarbonyloxy, alkoxycarbonyloxy, aryloxy, aryloxycarbonyloxy, carboxylate, alkylcarbonyl, arylcarbonyl, alkoxycarbonyl, aminocarbonyl, alkylaminocarbonyl, dialkylaminocarbonyl, alkylthiocarbonyl, alkoxyl, phosphate, phosphonate, phosphine, cyano, amino (including alkyl amino, dialkylamino, arylamino, diarylamino, and alkylarylamino), acylamino (including alkylcarbonylamino, arylcarbonylamino, carbamoyl and ureido), imino, sulfhydryl, alkylthio, arylthio, thiocarboxylate, sulfates, alkylsulfinyl, sulfonates, sulfamoyl, sulfonamido, nitro, trifluoromethyl, cyano, azido, heterocyclic, alkylaryl, or aromatic (including hetero aromatic) groups.

The present invention contemplates the possibility of omitting any components listed herein. The present invention further contemplates the omission of any components even though they are not expressly named as included or excluded from the invention.

The chemical structures herein are drawn according to the conventional standards known in the art. Thus, where an atom, such as a carbon atom, as drawn appears to have an unsatisfied valency, then that valency is assumed to be satisfied by a hydrogen atom, even though that hydrogen atom is not necessarily explicitly drawn. The structures of some of the compounds of this invention include stereogenic carbon atoms. It is to be understood that isomers arising from such asymmetry (e.g., all enantiomers and diastereomers) are included within the scope of this invention unless indicated otherwise. That is, unless otherwise stipulated, any chiral carbon center may be of either (R)- or (S)-stereochemistry. Such isomers can be obtained in substantially pure form by classical separation techniques and by stereochemically-controlled synthesis. Furthermore, alkenes can include either the E- or Z-geometry, where appropriate. In addition, the compounds of the present invention may exist in unsolvated as well as solvated forms with acceptable solvents such as water, THF, ethanol, and the like. In general, the solvated forms are considered equivalent to the unsolvated forms for the purposes of the present invention.

Inorganic Salts

The inorganic salts are essential to the invention and are chosen from sulfate, chloride, bromide, iodide, carbonate, phosphate, fluoride, and nitrate salts. Examples include sodium chloride, potassium chloride, lithium chloride, rubidium chloride, berylium chloride, magnesium chloride, calcium chloride, sodium fluoride, potassium fluoride, lithium fluoride, rubidium fluoride, beryllium fluoride, magnesium fluoride, calcium fluoride, sodium iodide, potassium iodide, lithium iodide, rubidium iodide, beryllium iodide, magnesium iodide, calcium iodide, potassium bromide, lithium bromide, rubidium bromide, beryllium bromide, magnesium bromide, calcium bromide ammonium chloride, ammonium fluoride, ammonium iodide, ammonium bromide, ammonium sulfate, potassium sulfate, lithium sulfate, rubidium sulfate, beryllium sulfate, magnesium sulfate, calcium sulfate, ammonium nitrate, potassium nitrate, lithium nitrate, rubidium nitrate, beryllium nitrate, magnesium nitrate, calcium nitrate, ammonium carbonate, potassium carbonate, lithium carbonate, rubidium carbonate, beryllium carbonate, magnesium carbonate, calcium carbonate, ammonium phosphate, potassium phosphate, lithium phosphate, rubidium phosphate, beryllium phosphate, magnesium phosphate, and calcium phosphate. In some embodiments, the salt is chosen from sodium chloride, potassium chloride, and ammonium sulfate. The inorganic salt can be present in a concentration of from about 0.1 and up to about 15 wt. %. The present inventive salts are those inorganic salts that are not known to have microbicidal properties on their own. The salt can be present in a concentration of from about 0.1, 0.8, 1.5, 2.5, 4.5, 6, and 9 wt. % and/or up to about 20, 15, 10, 8, 7, 5, 4, 3, 2, 1, 0.75, and 0.5 wt. %. These inorganic salts are water soluble and are strong electrolytes. Strong electrolyte salts are those that completely, or almost completely, ionize or dissociate in an aqueous solution.

Oxidizing Agents/Peroxide Compounds

The present solution can include oxidizing agents. In some embodiments, the compositions of the present invention may include from about 0.01, 0.1, 0.5, 0.8, 1, 1.5, 2, 2.5, 3, 3.5, and 4, and/or up to about 8, 7, 6, 5, 4.5, and 4 wt. % of on oxidizing agent.

It is to be understood that all ranges and values between these ranges and values are encompassed by the present invention. Preferably, the oxidizing agent is a peroxide compound. When used herein, a "peroxide compound" is a compound containing an oxygen-oxygen single bond or the peroxide anion:

$$[O-O]^{2-}$$

Examples include alkali metal peroxides (e.g. sodium peroxide).

Also included are compounds that generate and release hydrogen peroxide when dissolved in aqueous solution (e.g. urea peroxide, perboric acid, sodium/potassium perborate, sodium persulfate, calcium peroxide, lithium peroxide, sodium peroxide, or other peroxides of alkali, alkaline earth, or transition group metals or salts thereof).

Still other examples are compounds according to the following formulas:

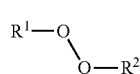
(I)

wherein R1 and R2 are independently a substituted or unsubstituted, branched or unbranched, cyclic or linear alkyl group. R1 and R2 may be connected to form a cyclic structure. Examples include dialkyl peroxides such as dibenzoyl peroxide, diacetyl peroxide, di(n-propyl) peroxydicarbonate, butyl peroxybenzoate, and many others commercially available under the brand name Luperox™. In certain cases, the R1 and R2 can be sulfurous or phosphorus atoms (e.g. peroxidisulfuric acid).

(II)

wherein R is H or a substituted or unsubstituted, branched or unbranched, cyclic or linear alkyl group. Examples include hydrogen peroxide, butyl hydroperoxide, ethylidene peroxide, ethyl hydroperoxide. In certain cases, the R can be sulfurous or phosphorus atoms (e.g. peroximonosulfuric acid).

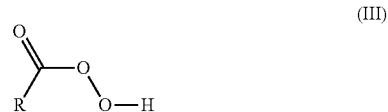
(III)

wherein R is a hydrogen, an oxygen, or a substituted or unsubstituted, branched or unbranched, cyclic or linear alkyl group. Examples include peroxycarboxylic acids (peracetic acid, peroctanoic acid, performic acid, peroxiphthalates, etc.), percarbonates (e.g. sodium percarbonates, potassium percarbonates), perbenzoic acid, cumene peroxide, and more.

Preferred peroxide compounds are hydrogen peroxide, sodium peroxide, benzoyl peroxide, dibenzyl peroxides, peroxycarboxylic acids (peracetic acid, peroctanoic acid, performic acid, etc.), percarbonates (e.g. sodium percarbonates, potassium percarbonates), peroxymonosulfuric acid, and peroxydisulfuric acid.

Amphoteric Amine Oxide Surfactant

Amphoteric amine oxide surfactants useful in the present invention are those having the formula R1R2R3NO wherein each of R1, R2, and R3 is independently a saturated, unsaturated, substituted or unsubstituted linear or branched alkyl group having from 1 to 28 carbon atoms. Examples include lauramine oxide, N,N-dimethylundecylamine N-oxide, N,N-dimethylheptylamine N-oxide, cocamidopropylamine oxide, coamidomethylamine oxide, cocamine oxide, lauryl amidopropyl amine oxide, myristyl amidopropyl amine oxide, coco dipropylamine oxide, coco dimethylamine oxide, cetylamine oxide, decylamine oxide, isodecyloxypropylamine oxide, myristamine oxide, alpha, alpha'-[(oxidoimino)bis(methyl-2,1-ethanediyl]) bis [omega-hydroxypoly[oxy(methyl-2,1-ethanediyl]), N-[3-(C9-11-isoalkyloxy) propyl] and its derivatives, tetradecyldimethylamine oxide, propoxy tallow amine oxides, and ethoxy tallow amine oxides.

Other Amphoteric Surfactants

Suitable amphoteric surfactants include alkyl amphocarboxylates, alkyl betaines, alkyl amidopropyl betaine amides, alkyl amidopropyl betaines, alkylsulfobetaines, amphoteric amine oxides, imidazolines, and derivatives thereof. Preferred imidazoline derivatives are alkylamphocarboxylates and alkyliminocarboxylates having the following structures.

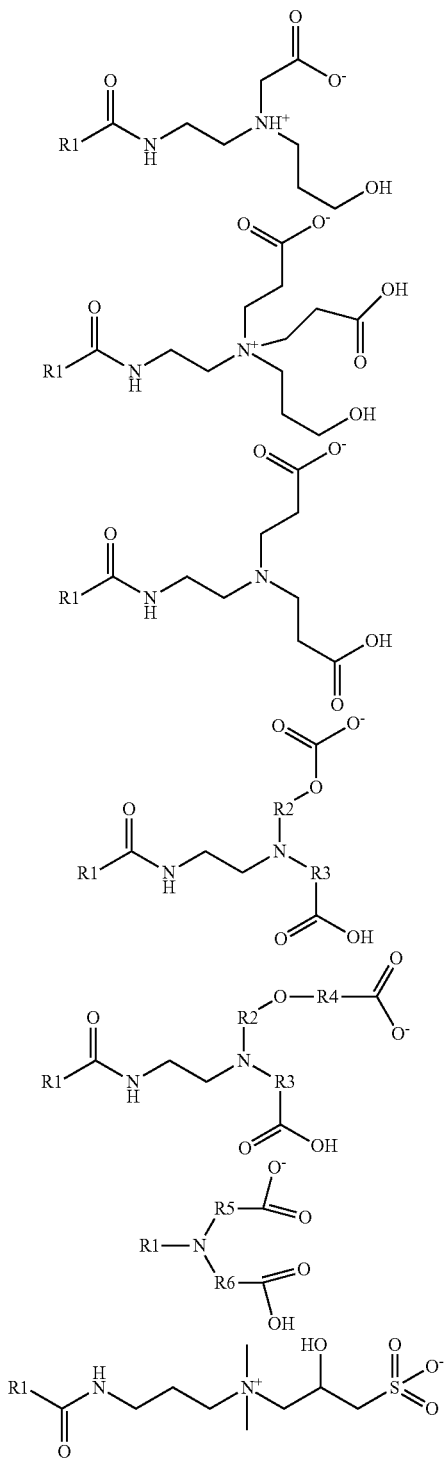

wherein R1 to R6 ore saturated or unsaturated, substituted or unsubstituted linear or branched alkyl group having from 1 to 24 carbon atoms. The alkyl group is preferably a linear alkyl chain having 8 to 16 carbon atoms.

When used, the surfactants may be present in a concentration of from about 0.01, 0.5, 2.5, 5, 10, 15 wt. %, and/or up to about 20, 15, 10, 3, or 1 wt. %.

Peroxide Stabilizers

Peroxide stabilizers and chelating agents may be included in embodiments of the invention including ethylenediaminetetraacetic acid (EDTA), diethylenetriaminepentaacetic acid (DTPA), N-(hydroxyethyl)-ethylenediaminetriacetic acid (HEDTA), nitrilotriacetic acid (NTA), 2-hydroxyethyl-iminodiacetic acid (HEIDA), benzoic acid, aminobenzoic acid, citric acid, iminodisuccinic acid, polyaspartic acid, phosphoric acid, tripolyphosphate, 1-hydroxyethylidene-1, 1,-diphosphonic acid, amino tri(methylene phosphonic acid), diethylenetriaminepenta(methylene phosphonic acid), 2-hydroxy ethylimino bis(methylene phosphonic acid), and ethylene diamine tetra(methylene phosphonic acid) and salts thereof.

Other useful stabilizers are poly-phosphonic acid chelating agents, and salts thereof, on their own or in combination with alkaline pH adjusting agents with a maximum pKb value of 3.0. Poly-phosphonic acid chelating agents mean chelating agents that contain more than one phosphonate or phosphonic acid group in each of their molecules. Examples of poly-phosphonic acid chelating agents are 1-hydroxyethane-1,1-diphosphonic acid (HEDP), aminotrimethylene phosphonic acid, diethylene tri-amine penta(methylene phosphonic acid), and ethylene di-amine tetra(methylene phosphonic acid), hexamethylenediamine-tetra(methylene phosphonic) acid. Examples of alkaline pH adjusting agents in accordance with the invention include potassium hydroxide (KOH), sodium hydroxide (NaOH), lithium hydroxide, magnesium hydroxide, calcium hydroxide, rubidium hydroxide, cesium hydroxide, strontium hydroxide and barium hydroxide.

When used, stabilizers can be present in a concentration of from about 0.005, 0.1, 1, 5, 10, or 15 wt. % and/or up to about 49, 40, 30, 20, 17.5, 12.5, 7.5, or 2.5 wt. %.

Also, when used, the w/w ratio of the poly-phosphonic acid chelating agent(s) and/or salt(s) thereof to the alkaline pH adjusting agent with a pKb value of up to 3.0 can be about 100:1, about 50:1, about 20:1, about 10:1, about 5:1, about 1:1, or about 1:5. Weight ratios in between these values are also contemplated herein.

Solvents, Carriers, Cyclic Alcohols

The disinfecting solution can further include an effective amount of at least one solvent, which can be chosen from cyclic alcohols (e.g. phenethyl alcohol, benzyl alcohol, phenoxyethanol, and cyclopentylmethanol), cyclic carbonates (e.g. propylene carbonate and dimethyl succinate), acetamidophenol, benzyl acetate, benzyl benzoate, acetanilide, acetophenone, 2-acetyl-1-methylpyrrole, essential oils (e.g., benzaldehyde, pinenes, terpineols, terpinenes, carvone, cinnamealdehyde, borneol and its esters, citrals, ionenes, jasmine oil, limonene, dipentene, linalool and its esters), diester dicarboxylates (e.g., dibasic esters, such as dialkyl adipate, dialkyl glutarate, dialkyl succinate), dialkyl carbonate, organo-nitriles, phthalate esters, propylene glycol derivatives with ethoxylation and/or propoxylation, alkoxytriglycols and other glycols such as methoxytriglycol, ethoxytriglycol, butoxytriglycol, hexyltriglycol, propylene glycol methyl ether acetate, dipropylene glycol methyl ether acetate, dipropylene glycol n-butyl ether, propylene glycol n-butyl ether, dipropylene glycol n-propyl ether, propylene glycol n-propyl ether, dipropylene glycol methyl ether, tripropylene glycol methyl ether, benzyl alcohol, phenoxyethanol, phenethyl alcohol, methanol, ethanol, butyl 3-hydroxybutyrate, isopropyl alcohol, ethylhexylglycerol, branched or unbranched diols, charged or uncharged non-surfactant emulsifying agents, polar protic solvents, polar aprotic solvents, diethylene glycol monobutyl ether, diethylene glycol monoethyl ether, butyl pyrrolidone, and mixtures thereof.

When used, the solvent may be present in a concentration of from about 0.05, 0.5, 1, 5, 10, 15, 20, 25, 30, 40, or 50 wt. % and/or up to about 85, 70, 60, 50, 40, 30, 25, 20, 10, or 5 wt. %.

Carboxylic Acids

In some embodiments, the solutions or compositions may comprise at least one branched or unbranched, saturated or unsaturated, substituted or unsubstituted, mono- or poly-carboxylic acid. The carboxylic acid may be chosen from C1 to C22 carboxylic acids. In some embodiments, the carboxylic acid may be a C5 to C11 carboxylic acid. In some embodiments, the carboxylic acid may be a C1 to C4 carboxylic acid. Examples of suitable carboxylic acids include but are not limited to 2-furoic acid, salicylic acid, benzoic acid, citric acid, sulfosalicylic acid, sulfosuccinic acid, glycolic acid, lactic acid, formic acid, oxalic acid, malic acid, acetic acid, propionic acid, butanoic acid, pentanoic acid, hexanoic acid, heptanoic acid, octanoic acid, nonanoic acid, decanoic acid, undecanoic acid, dodecanoic acid, as well as their branched isomers, maleic acid, ascorbic acid, alpha-or-beta hydroxy-acetic acid, neopentanoic acid, neoheptanoic acid, neodecanoic acid, malonic acid, succinic acid, glutaric acid, adipic acid, pimelic suberic acid, and mixtures thereof.

When used, the acids may be present in a concentration of from about 0.05, 0.5, 1, 5, 10, 15, or 20 wt. %, and/or up to about 40, 30, 20, 10, or 5 wt. %.

Other Organic and Inorganic Acids

In certain embodiments, solutions or compositions may include one or more other organic acids, inorganic acids and salts thereof.

Suitable inorganic acids include but are not limited to sulfuric acid, sodium bisulfate, phosphoric acid, nitric acid, hydrochloric acid, hypochlorous acid, sulfamic acid, salts thereof, and mixtures thereof. Suitable organic acids include, but are not limited to, methane sulfonic acid, ethane sulfonic acid, propane sulfonic acid, butane sulfonic acid, xylene sulfonic acid, benzene sulfonic acid, toluenesulfonic acid, naphthalene disulfonic acid, alkyl sulfonic acids such as linear alkyl benzene sulphonic acid, alkyl diphenyloxide disulfonic acid, cumene sulfonic acid, lauryl sulfonic acid xylene sulfonic acid, mono, di, or tri-halocarboxylic acids, picolinic acid, dipicolinic acid, and mixtures thereof.

When present, the total amount of these organic and/or inorganic acids may be from about 0.05, 0.5, 1, 5, 10, 15, or 20 wt. %, and/or up to about 40, 30, 20, 10, or 5 wt. %.

Hydrotropes

The solution of the invention may include one or more hydrotropes, including but not limited to salts of aryl and alkylaryl sulfonic acids such as xylene sulfonic acid, cumene sulfonic acid, toluene sulfonic acid. Other hydrotropes include polyether phosphate esters, alkyl sulfates, alkyl and alkylaryl sulfonates, diphenyloxide disulfonates, and benzoic acid salts.

When used, the hydrotrope may be present in a concentration of from about 0.1, 1, 3, 5, 10, or 20 wt. % and/or up to about 25, 15, 8, 4, or 1.5 wt. %.

Antimicrobial Compounds

In other embodiments, the compositions may include an effective amount of an additional antimicrobial compound (e.g. sanitizing or disinfecting agent) for killing microbes and the like. The antimicrobial compound may be chosen from and is not limited to essential oils, quaternary ammonium compounds, organic acids, parabens, aldehydes, phenolic compounds, alcohols, halogen-type or peroxygen-type bleaches, biguanides, formaldehyde or formaldehyde releasing agents, peroxy-carboxylic acids, or mixtures thereof.

When used, the concentration of the antimicrobial compound may be from about 0.005, 0.1, 1, 5, 10, 20 wt. %, and/or up to about 40, 30, 20, 15, 8, 3, or 0.5 wt. %.

Additional Ingredients

The present inventive compositions may include an effective amount of one or more additional ingredients as would be apparent to the person skilled in the art, including without limitation, pigments and dyes, fragrances, rheology modifiers, corrosion inhibitors, anti-foaming agents, skin conditioning agents, softening agents, anti-static agents, anti-wrinkling agents, dye transfer inhibition/color protection agents, odor removal/odor capturing agents, buffering agents, pH monitoring and adjusting agents, builders, emollients, bleach activators, enzymes, chelating agents, brighteners, radical scavengers, preservatives, soil shielding/soil releasing agents, ultraviolet light protection agents, water repellency agents, insect repellency agents, anti-pilling agents, souring agents, mildew removing agents, allergicides, and mixtures thereof.

In embodiments for use on skin, the disinfecting solution may include an effective amount of at least one emollient or skin conditioning agent, including but not limited to glycerin, poly-glycerin, butylene glycol, glycerides, castor oil, aliontoin, cationic polymers, lanolin and its derivatives, polyols and glycols such as glycerol, polyglycerol, sorbitol, mannitol, erythritol, xylitol, arabitol, ribitol, dulcitol, lactitol, maltitol, propylene glycol, hexylene glycol, ceramides, essential fatty acids such as linolenic acid, gamma-linolenic acid, linoleic acid, gamma-linoleic acid, tocopherols such as tocopheryl acetate, quaternised gums, quaternised polymers, glucose-ethers, vegetable oils, long chain fatty acids, long chain alcohols (e.g. cetyl alcohol), and phospholipids, and mineral oils. When used, the skin conditioning agent may be present in a concentration of from about 0.01, 0.5, 2, 5, or 10 wt. %, and/or up to about 30, 25, 20, 15, 8, 4, 1 wt. %.

If necessary to achieve a pH within the desired range, the solution can include a pH adjusting agent including, without limitation, inorganic acids, e.g. phosphoric acid, organic acids, e.g. citric acid, and alkaline agents, e.g. potassium hydroxide (KOH) and sodium hydroxide (NaOH).

When used, one or more dyes may be present in a concentration of from about 0.0002, 0.05, 1, 2, or 3 and/or up to about 5, 3, 2, 1, 0.5 or 0.01 wt. %.

Fragrances may be present in a concentration of from about 0.01, 0.5, 1, or 5 wt. % and/or up to about 7, 3, 2, 0.2 wt. %.

Rheology modifiers, including but not limited to xanthan gum or guar gum, may be present in a concentration of from about 0.02, 0.5, 1, 5, 10 wt. %, and/or up to about 15, 7, 3, 0.7, 0.1, or 0.02 wt. %.

Corrosion inhibitors, including but not limited to benzotriazoles, molybdate salts, and zinc dithiophosphate, may be present in a concentration of from about 0.01, 0.5, 1, 5, 10 wt. %, and/or up to about 15, 7, 3, 0.1, 0.05 wt. %.

Anti-foaming agents, including but not limited to siloxanes, low-solubility oils, low-HLB nonionic surfactants, may be present in a concentration of from about 0.001, 0.1, 0.5, 2, 4, 5, or 7 wt. %, and/or up to about 10, 8, 5, 4, or 3 wt. %.

Buffering agents may be present in a concentration of from about 0.01, 0.5, 1, 5, or 7 wt. %, and/or up to about 10, 5, 3, 0, 1, or 0.05 wt. %.

Builders may be present in a concentration of from about 0.01, 0.5, 2, 4, or 5 wt. %, and/or up to about 8, 3, 1, or 0.1 wt. %.

Bleach activators may be present in a concentration of from about 0.0005, 0.01, 1, 5, or 10 wt. %, and/or up to about 15, 8, 3, or 0.1 wt. %.

Soil suspenders may be present in a concentration of from about 0.01, 0.5, 2, 5, or 10 wt. %, and/or up to about 15, 8, 4, 1, or 0.1 wt. %.

Brighteners may be present in a concentration of from about 0.0005, 0.05, 0.1, 2, or 7 wt. %, and/or up to about 10, 5, 3, 1, or 0.01 wt. %.

Radical scavengers may be present in a concentration of from about 0.005, 0.5, 1, 5, or 15 wt. %, and/or up to about 20, 10, 3, 0.1, or 0.01 wt. %.

Other additional ingredients that may be included are nonionic and/or cationic surfactants that are compatible with peroxides. Exemplary nonionic surfactants are those disclosed in U.S. Pat. No. 8,871,807 to Gohl et al. (these surfactants are incorporated herein by reference).

Compositions or solutions according to the invention can be formulated in concentrated or solid form (e.g. tablets, powder, etc.), as well as in multi-part systems such as two-port systems wherein liquid components are included in one part, and solid components are included in another part. Solutions according to the invention can be packaged in a dispenser, such as a spray dispenser, or another suitable dispenser package.

The following examples will help to illustrate the utility and novelty of the invention.

Test Results

Different embodiments of the invention were prepared and tested for their peroxide stability and antimicrobial efficacy. All the compositions disclosed herein were demonstrated to have suitable peroxide stability. Antimicrobial tests were done using methods maintained by European Committee for Standardization. Example antimicrobial standard methods include EN 1499, EN 1276, EN 1650, EN 13727 and EN 13624. Efficacy of the compositions against various microorganisms were measured based on log reductions compared to the original microbial titer's population.

The ingredients used in the solutions tested and set forth before are summarized as follows:

Ingredient List
Peroxide Compound/Oxidizing Agent
Hydrogen Peroxide—35% wt. solution available from Solvay S.A.
Salts
Sodium Chloride—100% wt. compound from Univar
Ammonium Sulfate—100% wt. compound from DSM
Inorganic Acid/Peroxide Stabilizer
Phosphoric acid—75% wt. solution from Univar
Surfactants
Lauramine Oxide—30% wt. solution from Solvay S.A.
Cocamidopropyl Betaine—30% wt. solution from Solvay S.A.
Solvent/Cyclic Alcohols
Phenoxyethanol—100% wt. compound from BASF
Phenethyl alcohol—100% wt. compound from Fragrance Oils (International) Limited
Cyclic Carboxylic Acid/Acidifiers
Salicylic Acid—100% wt. compound from Univar
2-Furoic acid—100% wt. compound from Swadev Chemicals
Benzoic acid—100% wt. compound from Univar
Skin Conditioning Agents
1,3 Butylene Glycol—100% wt. compound from Kemcare
Glycerin—100% wt. compound from Made-King Roinson & Co. Ltd.
Polyglycerin—6-80% wt. solution from Lonza Examples In the below tables, the amount of each ingredient shown is expressed in terms of wt. % based on the total weight of the solution.

TABLE 1

Solutions 1-9 were tested against *E. hirae* at 30 and 60 second contact times using the EN1276 test method.

| Ingredient | 1 | 2 | 3 | 4 | 5 | 6 | 7 | 8 | 9 |
|---|---|---|---|---|---|---|---|---|---|
| Water | Qs to 100 | | | | | | | | |
| Hydrogen Peroxide | 1.05 | 1.05 | 1.05 | 1.05 | 1.05 | 1.05 | 1.05 | 1.05 | 1.05 |
| Lauramine Oxide | 3.00 | 3.00 | 3.00 | 3.00 | 3.00 | 3.00 | 3.00 | 3.00 | 3.00 |
| 1,3 Butylene Glycol | 3.00 | 3.00 | 3.00 | 3.00 | 3.00 | 3.00 | 3.00 | 3.00 | 3.00 |
| Glycerin | 3.00 | 3.00 | 3.00 | 3.00 | 3.00 | 3.00 | 3.00 | 3.00 | 3.00 |
| Polyglycerin-6 | 0.40 | 0.40 | 0.40 | 0.40 | 0.40 | 0.40 | 0.40 | 0.40 | 0.40 |
| Salicylic Acid | 0.20 | 0.20 | 0.20 | 0.20 | 0.20 | 0.20 | 0.20 | 0.20 | 0.20 |
| Phenoxyethanol | — | 0.90 | — | 0.90 | — | 0.90 | — | — | — |
| Benzoic Acid | — | 0.15 | — | 0.15 | — | 0.15 | — | — | — |
| Sodium Chloride | — | — | 0.50 | 0.50 | 1.00 | 1.00 | 3.00 | 5.00 | 7.00 |
| Phosphoric Acid - to adjust pH to 2.25 ± 0.1 | 1.74 | 1.39 | 1.93 | 1.50 | 2.03 | 1.39 | 1.82 | 1.66 | 1.60 |
| pH** | 2.25 | 2.25 | 2.25 | 2.25 | 2.25 | 2.25 | 2.25 | 2.25 | 2.25 |
| Log Reduction (*E. hirae*, 30 sec.) | 1.2 | 1.9 | 2.1 | 5 | 4 | >5.2 | >5.2 | >5.2 | >5.2 |
| Log Reduction (*E. hirae*, 60 sec.) | 1.5 | 2.7 | 4.2 | >5.2 | >5.2 | >5.2 | >5.2 | >5.2 | >5.2 |

**Due to measurement tolerances, the pH value expressed above is ±0.1.

Solutions 1 and 2 are not in accordance with the present invention as they contain no inorganic salt. As can be seen by comparing Solution 1 with Solution 3, and by comparing Solution 2 with Solution 4, the sodium chloride surprisingly contributes significantly to antimicrobial efficacy. These results are surprising as the salt at the concentration employed exhibits no antimicrobial efficacy on its own.

Solutions 5, 7, 8 and 9 are the same as Solution 3 except for the amount of sodium chloride. These examples show that efficacy can be improved by increasing the concentration of the salt. The same trend can be seen by comparing Solution 4 with Solution 6.

TABLE 2

Solutions 10-14 were tested against *E. hirae* at 30 second contact time using the EN1276 test method.

| Ingredient | 10 | 11 | 12 | 13 | 14 |
|---|---|---|---|---|---|
| Water | Qs to 100 | | | | |
| Hydrogen Peroxide | 1.05 | 1.05 | 1.05 | 1.05 | 1.05 |
| Lauramine Oxide | 3.00 | 3.00 | 3.00 | 3.00 | 3.00 |
| 1,3 Butylene Glycol | 3.00 | 3.00 | 3.00 | 3.00 | 3.00 |
| Glycerin | 3.55 | 3.55 | 3.55 | 3.55 | 3.55 |
| Phosphoric Acid to adjust pH to 2.0 ± 0.1 | 2.94 | 3.03 | 3.17 | 1.76 | 1.91 |
| pH** | 2 | 2 | 2 | 2 | 2 |
| Salicylic Acid | 0.20 | 0.20 | 0.20 | — | — |
| 2-Furoic acid | — | — | — | 1.00 | 1.00 |
| Sodium Chloride | — | — | — | — | 0.75 |
| Ammonium Sulphate | 0.40 | 0.57 | 0.75 | — | — |
| Log Reduction (*E. hirae*, 30 sec.) | 3 | 3.1 | 3.1 | 4.1 | >5.8 |

**Due to measurement tolerances, the pH value expressed above is ± 0.1.

Comparing Solutions 10, 11 and 12 and their results with Solution 1 and its result, one can see that the salt, ammonium sulphate, also surprisingly contributes to antimicrobial efficacy. At the concentrations employed in Solutions 10, 11 and 12, ammonium sulphate exhibits no antimicrobial efficacy on its own. The minor differences in the concentration of ammonium sulphate in Solutions 10, 11 and 12 do not materially affect the disinfecting activity of these solutions.

Solution 13 is not in accordance with the present invention in that it contains no inorganic salt. Comparing the results for Solutions 13 and 14 shows the surprising contribution of the sodium chloride to antimicrobial efficacy.

TABLE 3

| Ingredient | 15 | 16 | 17 | 18 | 19 | 20 | 21 |
|---|---|---|---|---|---|---|---|
| Water | Qs to 100 | | | | | | |
| Hydrogen Peroxide | 1.05 | 1.05 | 1.58 | 1.05 | 1.05 | 1.05 | 1.05 |
| Sodium Chloride | 0.75 | 0.75 | 0.75 | 0.75 | 0.75 | 0.75 | 0.75 |
| 1,3 Butylene Glycol | 3.00 | 3.00 | 3.00 | 3.00 | 3.00 | 3.00 | 3.00 |
| Glycerin | 3.55 | 3.55 | 3.55 | 3.55 | 3.55 | 3.55 | 3.55 |
| Lauramine Oxide | 3.00 | 3.00 | 3.00 | 3.00 | 3.00 | 2.45 | 2.45 |
| phenoxyethanol | — | 1.00 | 1.00 | 1.00 | 1.00 | 1.00 | 1.00 |
| 2-Furoic acid | 0.75 | 1.00 | 1.00 | 1.00 | 1.00 | 1.00 | 1.00 |
| Phosphoric Acid | 2.76 | 1.07 | 1.07 | 1.25 | 0.47 | 0.86 | 1.09 |
| Phenethyl alcohol | — | 1.00 | 1.00 | 0.50 | 0.50 | — | 0.13 |
| Cocamidopropyl Betaine | — | — | — | — | — | 0.85 | — |
| Ph | 2 | 2.5 | 2.5 | 2.5 | 3 | 2.5 | 2.25 |
| Log Reduction (*E. hirae*, 30 sec.) | >5.8 | Not tested | Not tested | >5 | Not tested | >5 | Not tested |
| Log Reduction (*S. aureus*, 30 sec.) | >5.4 | Not tested | Not tested | >5 | Not tested | >5 | Not tested |
| Log Reduction (*C. albicans*, @60 sec.) | 2.4 | >4.6 | >4.6 | >4.6 | 4 | >4.7 | >4.4 |
| Log Reduction (*C. albicans*, @30 sec.) | Not tested | Not tested | Not tested | >4.6 | 2.4 | 3.8 | Not tested |

**Due to measurement tolerances, the pH value expressed above is ±0.1.

Solutions 15-21 were tested against *E. hirae* and *S. aureus* at a 30 second contact time using the EN 1276 test method, and against *C. albicans* at 30 and 60 second contact times using the EN 1650 test method. The results are shown above in Table 3.

Solutions 15 through 21 are different embodiments of solutions according to the invention. These solutions provide superior antimicrobial efficacy against multiple model microorganisms, i.e. *E. hirae, S. oureus* and *C. albicans*.

The above-mentioned embodiments of the invention are useful as topical disinfectants, e.g. for use on skin, hair, fur and the like. Other topical disinfecting formulations may comprise the following: a) sodium chloride in a concentration of from about 0.1 to about 3 wt. %, preferably from about 0.25 to 1.5 wt. %; b) hydrogen peroxide in a concentration of from about 0.2 to 4 wt. %, preferably from about 0.5 to about 2 wt. %; c) lauramine oxide in a concentration of from about 0.5 to 5 wt. %, preferably from about 1 to about 3 wt. %; d) 2-furoic acid in a concentration of from about 0.2 to about 3 wt. %, preferably from about 0.5 to about 2 wt. %; e) phenoxyethanol in a concentration of from about 0.2 to about 3 wt. %, preferably from about 0.5 to about 2 wt. %; f) phenethyl alcohol in a concentration of from about 0.1 to about 1 wt. %, preferably from about 0.2 to about 0.6 wt. %; g) phosphoric acid in a concentration of from about 0.3 to about 3 wt. %, preferably from about 0.5 to about 2 wt. %; h) glycerin in a concentration of from about 0.5 to about 5 wt. %, preferably from about 1.5 to about 4 wt. %; i) butylene glycol in a concentration of from about 0.5 to about 5 wt. %, preferably from about 1.5 to about 4 wt. %; and j) water q.s. to 100.

Solutions according to the present invention can be used to reduce microbes in a wide variety of applications, such as in disinfection, sanitization, sterilization, cleaning, bleaching, water and soil treatment, petroleum extraction and refinery, mining, odor control, and food processing applications. The solution can be used on animate and inanimate surfaces, including, without limitation, skin, fur, hair, mucous membranes, hard and soft surfaces (including floors, countertops, carpets, textiles), porous and non-porous surfaces, tools and devices (including medical devices), animals, plants, and animal and plant matter, and combinations thereof. The above description of embodiments is by way of example only and shall not be construed to limit the scope of the invention described and claimed. The person skilled in the art will appreciate that variations to the aforementioned embodiments are possible without departing from the scope of the invention.

The invention claimed is:

1. A disinfecting solution comprising:
   at least one inorganic salt chosen from sodium chloride, ammonium sulfate, sodium sulfate, sodium phosphate in an amount of from about 0.5 wt % to about 8 wt %;
   hydrogen peroxide in an amount of from about 0.5 wt % to about 3 wt %;
   lauramine oxide in an amount of from about 0.5 wt % to about 8 wt %; and
   water;
   wherein the pH is from about 1.5 to about 4.

2. The disinfecting solution of claim 1, wherein the disinfecting solution further comprises at least one pH adjusting agent.

3. The disinfecting solution of claim 1, wherein the disinfecting solution further comprises at least one amphoteric surfactant.

4. The disinfecting solution of claim 3, wherein the at least one amphoteric surfactant is cocarnidopropyl betaine.

5. The disinfecting solution of claim 1, wherein the disinfect solution further comprises at least one solvent.

6. The disinfecting solution of claim 5, wherein the at least one solvent is selected from the group consisting of phenethyl alcohol, benzyl alcohol, phenoxyethanol, and cyclopentylmethanol.

7. The disinfecting solution of claim 1, wherein the disinfecting solution further comprises at least one of salicylic acid, benzoic acid and 2-furoic acid.

8. The disinfecting solution of claim 1, wherein the disinfecting solution further comprises skin conditioning agent.

9. The disinfecting solution of claim 8, wherein the skin conditioning agent comprises glycerin, poly-glycerin, butylene glycol, or any mixture thereof.

10. The disinfecting solution of claim 1, wherein the disinfecting solution further comprises at least one additive chosen from buffering agents, dyes, fragrances, rheology modifiers, corrosion inhibitors, peroxide stabilizing agents, hydrotropes, non-ionic surfactants, cationic surfactants, soil suspenders or anti- redeposition agents, or additional antimicrobial agents.

11. A diluted disinfecting solution, obtained by diluting the disinfecting solution of claim 1.

12. A concentrated disinfecting solution, wherein upon dilution provides the disinfecting solution of claim 1.

13. The disinfecting solution of 1, for use in disinfection or sanitization.

14. The disinfecting solution of claim 1, effective to increase the reduction of microorganisms by at least 1 log when the at least one inorganic salt is present, as compared to when the at least one inorganic salt is absent, using the EN 1276 test method against *E. hirae* at a contact time of 30 or 60 seconds.

15. A method of disinfecting or sanitizing a surface comprising applying an effective amount of the solution of claim 1 to the surface for a contact time of at least 10 seconds.

* * * * *